July 1, 1969  R. C. CROSS  3,452,648
CYLINDER MOUNTINGS
Filed June 21, 1967
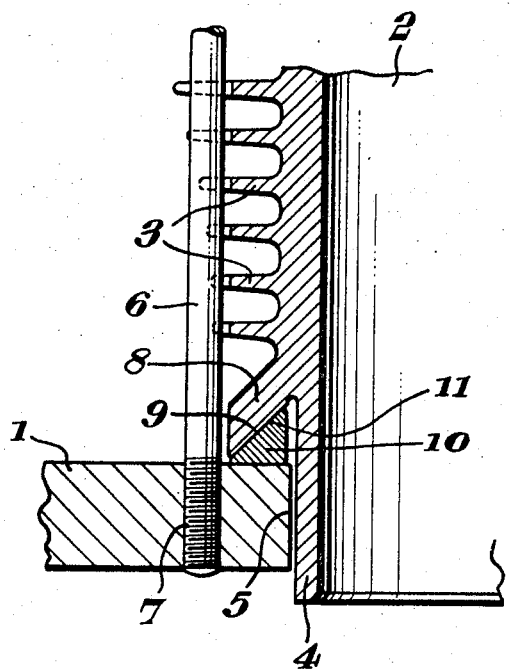
INVENTOR
ROLAND C. CROSS
BY Emory L. Groff
ATTY United States Patent Office 3,452,648
Patented July 1, 1969

3,452,648
CYLINDER MOUNTINGS
Roland Claude Cross, 33 Medford Road,
Bath, Somerset, England
Filed June 21, 1967, Ser. No. 647,681
Claims priority, application Great Britain, May 23, 1967,
23,819/67
Int. Cl. F01p *9/00;* F16b *9/02;* F01b *29/00*
U.S. Cl. 92—161                                    2 Claims

ABSTRACT OF THE DISCLOSURE

The cylinder of an internal combustion engine is secured by holding-down bolts in a hole of a base, and a metal compensating sealing ring is interposed between a flange around the exterior of the cylinder and the edge of the hole, the flange and ring having complemental tapering faces, the coefficient of thermal expansion of the ring being less than that of the metal of the cylinder.

---

This invention relates to assemblies of differentially expandable metal parts, particularly assemblies of the kind comprising a cylinder of one metal and holding bolts of another metal maving a co-efficient of thermal expansion less than that of the metal of the cylinder, the bolts extending parallel to the axis of the cylinder between fastenings on the cylinder and on a base on which the cylinder is held by the bolts. Hereinafter assemblies as defined above will be identified as being "of the kind specified."

A typical and probably most common instance of an assembly of the kind specified is presented by an internal combustion engine having an air cooled aluminum cylinder held on a crank case by external steel bolts extending between the cylinder head and the crank case. For obvious reasons, which are unavoidable, the bolts run cooler than the cylinder, and, since the co-efficient of thermal expansion of steel is less than that of aluminum, the cylinder will expand axially more than the bolts which are thereby put under increased tension. The tensile forces may become so great as to permanently stretch the bolts and even destroy the fastenings by causing the threads to be stripped.

Although the invention has been developed in connection with internal combustion engines, it is appreciated that a similar problem may exist in an analogous assembly wherein the running temperature may be less than the ambient temperature so that at the running temperature the bolts may tend to become loose as the cylinder shrinks less than the bolts.

The object of the invention is to provide an assembly of the kind specified wherein the above described disadvantages are at least reduced in intensity and may even be eliminated.

For convenience the arrangements are described and defined as with the cylinder on a vertical axis, but it is obvious that the invention is applicable to cases where the cylinder is horizontal or inclined.

In accordance with the invention the cylinder has, at its lower end adjacent to the base, an external annular downward-facing frusto-conical abutment surface and there is positioned between that surface and the base a compensating ring having an upper frusto-conical abutment surface complementary to and in engagement with the abutment surface on the cylinder so that the ring is axially located by the cylinder, the ring is formed of metal having its co-efficient of thermal expansion less than that of the metal of the cylinder, and the frusto-conical surfaces taper away from the base, so that as the dimensions of the cylinder change with temperature the diametrical dimensions of the ring will alter to an extent to at least partially compensate for the dimensional changes of the cylinder.

The compensating ring may also have a lower frusto-conical abutment surface complementary to and in engagement with a frusto-conical surface on the base.

The abutment surface on the cylinder may be formed on an external flange.

The compensating ring may be formed of a metal having its co-efficient of thermal expansion equal, or substantially equal to that of the bolts.

The invention will be further described and explained with reference, by way of example, to its application to an internal combustion engine in the manner illustrated in the accompanying diagrammatic sectional figure.

The figure illustrates a flat base 1 provided by part of a crank case. On the base 1 is mounted an aluminum cylinder 2 with external cooling fins 3, the lower end 4 of the cylinder extending freely through an opening 5 in the base 1. The cylinder is held on the base by long bolts 6, of which only part of one bolt is shown, extending parallel to the axis of the cylinder between an upper fastening to the cylinder head in the conventional manner and a lower attachment to the base, the lower attachment comprising the threaded end 7 of a bolt 6 screwed into the base. The bolts are of steel.

At its lower end the cylinder 2 has an external annular flange 8 located above and, as described below, spaced from the base 1, and having a lower, upwardly tapering, frusto-conical abutment surface 9. The flange 8 may be extended outwardly so that a rubber or other soft sealing ring can be inserted between its extremity and the top of the crank case, the long bolts 6 being suitably spaced from the cylinder to permit the introduction of such a sealing ring. Between the abutment surface 9 and the base is located a steel compensating ring 10 presenting an upper frusto-conical abutment surface 11 which is in engagement with and complementary to the other abutment surface 9. The radial section of the ring 10 is a right-angle triangle with its base in engagement with the aforementioned base 1 and its vertical parallel to the axis of the cylinder and spaced from the exterior of the lower part 4 thereof. It will be appreciated that the ring 10 will be clamped by the bolts 6 between the flange 8 and the base 1 and will be axially located by the co-operating abutment surfaces 9, 11.

In a modification the ring 10 may also have a lower frusto-conical abutment surface complementary to and in engagement with the surface of a frusto-conical edge formed on the top of the crank-case.

When the engine is running, the average temperature of the aluminum cylinder 2 will be higher than the temperature of the bolts 6. If there is any tendency for alteration of the lengths of the steel bolts 6, it will be considerably less than the change in axial dimension of the cylinder and, for the purpose of this explanation, it can be assumed that the distance of the cylinder head from the base 1 is substantially unchanged. The cylinder will expand in two directions; its axial dimension will increase so that the lower flange 8 will tend to move towards the base 1 as permitted by the aforementioned initial gap between the flange and the base, and its diameter will increase.

The running temperature of the ring 10 would ordinarily be substantially the same as that of the flange 8 with which it is in contact; being of steel its rate of expansion will be less than that of the aluminum cylinder. Its actual axial expansion will be less than that of the cylinder since its initial axial dimension is considerably less than that of the cylinder. Since the ring 10 has a diameter approximating to that of the flange 8, the amount of expansion of the ring diametrically will be less than that of the flange 8 in the proportion of the co-efficients of thermal expansion of steel and aluminum.

By appropriately selecting the angle of the frusto-conical surfaces it can be arranged that, in expanding, the flange 8 will slide, downwardly and outwardly, on the ring 10, with abutment surfaces 9, 11 maintained in close contact, so that there will not be generated an undesirable increase of tension in the bolts 6 although it would be desirable that there should always be some pressure of one abutment surface on the other.

In many applications of the invention the frusto-conical surfaces may be inclined at 45 degrees to the axis of the cylinder. The most effective angle is calculable in terms of such factors as the co-efficients of expansion of the metals, the dimensions of the component parts, the ranges of the temperature, the temperature difference as between the bolts and cylinder, and the permissible maximum tension in the bolts.

It will be appreciated that during cooling the compensating effort of the ring 10 will operate in the reverse sense.

It will also be appreciated that the arrangement would be similarly effective in any other analogous assembly where the cylinder is of material having a co-efficient of thermal expansion greater than that of the bolts and whether, in dependence upon the particular function of the apparatus of which the assembly is part, the running temperature of the cylinder is above or below that of the bolts.

I claim:
1. In an internal combustion engine, the combination of a cylinder with a cylinder-head formation and a metal having a thermal co-efficient of expansion greater than that of steel, a base member, steel bolts extending, externally of the cylinder and the length thereof, between and fastened to the cylinder-head formation at one end of the cylinder and the base member at the other end of the cylinder to hold the cylinder on the base member, and means to at least in part relieve the bolts of stress resulting from thermal expansion of the cylinder, said means comprising the end of the cylinder, opposite to the cylinder-head, extending freely through an opening in the base member, an annular frusto-conical abutment face externally on a portion of the cylinder adjacent said end of the cylinder, the face being spaced from, facing towards and tapering away from the base member and toward the axis of the sleeve so as to define an annular chamber between the base member, abutment face and the portion of the cylinder adjacent the end, and a compensating steel ring having a frusto-conical face complementary to said abutment face, the ring being positioned on the base member between said abutment face and the base member with the frusto-conical faces in mutual engagement, so that the ring is axially located by being clamped, by the bolts, between said abutment face and the base member.

2. In an internal combustion engine, the combination as claimed in claim 1, wherein also the compensating steel ring has a second frusto-conical face on the side thereof facing the base member, and the base member has a second frusto-conical abutment face complemental to and in engagement with said second frusto-conical face of the compensating steel ring.

References Cited

UNITED STATES PATENTS

| 1,432,371 | 10/1922 | Viale. | |
|---|---|---|---|
| 1,789,190 | 1/1931 | Noble | 123—41.69 XR |
| 1,825,769 | 10/1931 | Barbarou | 123—41.69 XR |
| 2,168,131 | 8/1939 | Mader | 92—171 |
| 2,170,443 | 8/1939 | Barbarou | 92—171 |
| 2,867,460 | 1/1959 | Johnson | 287—52 |

FOREIGN PATENTS

| 375,333 | 6/1932 | Great Britain. |
|---|---|---|
| 384,716 | 12/1932 | Great Britain. |
| 798,142 | 7/1958 | Great Britain. |

CARL W. TOMLIN, *Primary Examiner.*

A. V. KUNDRAT, *Assistant Examiner.*

U.S. Cl. X.R.

287—20